(12) United States Patent
Kahrobaiyan et al.

(10) Patent No.: US 12,181,838 B2
(45) Date of Patent: Dec. 31, 2024

(54) FLEXIBLE GUIDE WITH TRANSLATION TABLE FOR A ROTATING RESONATOR MECHANISM, IN PARTICULAR FOR A HOROLOGICAL MOVEMENT

(71) Applicant: The Swatch Group Research and Development Ltd, Marin (CH)

(72) Inventors: Mohammad Hussein Kahrobaiyan, Neuchâtel (CH); Pascal Winkler, St-Blaise (CH); Jean-Luc Helfer, Le Landeron (CH); Gianni Di Domenico, Neuchâtel (CH); Grégory Musy, Le Mont-sur-Lausanne (CH); Florent Cosandier, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 549 days.

(21) Appl. No.: 17/481,821

(22) Filed: Sep. 22, 2021

(65) Prior Publication Data

US 2022/0137562 A1 May 5, 2022

(30) Foreign Application Priority Data

Oct. 29, 2020 (EP) ..................................... 20204744

(51) Int. Cl.
*G04B 17/32* (2006.01)
*G04B 17/06* (2006.01)

(52) U.S. Cl.
CPC ........... *G04B 17/32* (2013.01); *G04B 17/063* (2013.01)

(58) Field of Classification Search
CPC ............................... G04B 17/32; G04B 17/063
(Continued)

(56) References Cited

U.S. PATENT DOCUMENTS

2013/0176829 A1* 7/2013 Cusin ..................... G04B 15/00
368/127
2018/0284695 A1* 10/2018 Maier .................. G04B 17/045
(Continued)

FOREIGN PATENT DOCUMENTS

CN  103097965 A  5/2013
CN  110780572 A  2/2020
(Continued)

OTHER PUBLICATIONS

Thalmann, Etienne, Flexure Pivot Oscillators for Mechanical Watches (Jun. 2020) (Year: 2020).*
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A flexible guide for a rotating resonator mechanism, in particular of a horological movement, the guide including a fixed support, an element that is capable of moving relative to the fixed support, at least one main flexible blade allowing the movable element to move relative to the fixed support by bending the one or more main flexible blades via a rotary motion about a centre of rotation, the flexible guide being arranged substantially in one plane, and includes at least one translation table joined to one end of the main flexible blade, the main flexible blade and the translation table forming a pair connected to the fixed support, to the movable element, or to an intermediate movable part, such that the translation table is configured to move in translation at least in part under the effect of the bending of the main flexible blade.

15 Claims, 5 Drawing Sheets

(58) Field of Classification Search
USPC .......................................................... 368/175
See application file for complete search history.

(56) References Cited

U.S. PATENT DOCUMENTS

| | | | | |
|---|---|---|---|---|
| 2019/0120287 A1* | 4/2019 | Cosandier | .............. | B64G 1/222 |
| 2020/0033805 A1* | 1/2020 | Di Domenico | ...... | G04B 17/045 |
| 2020/0150595 A1* | 5/2020 | Winkler | ............... | G04B 17/045 |

FOREIGN PATENT DOCUMENTS

| | | | | |
|---|---|---|---|---|
| EP | 3 438 762 A2 | 2/2019 | | |
| EP | 3 476 748 A1 | 5/2019 | | |
| JP | 2020-16644 A | 1/2020 | | |
| WO | WO-2020016131 A1 * | 1/2020 | ........... | G04B 17/045 |

OTHER PUBLICATIONS

European Search Report issued Mar. 5, 2021 in European Application 20204744.5, filed on Oct. 29, 2020 , citing documents AA and AO-AQ therein, 3 pages.
Japanese Office Action Issued Oct. 11, 2022 in Japanese Patent Application No. 2021-163261 (with English translation), citing document 15 therein, 12 pages.
Office Action issued Jun. 26, 2024, in corresponding Chinese Patent Application No. 202111273035.9, citing documents 15 and 16 therein, 8 pages.

* cited by examiner

FLEXIBLE GUIDE WITH TRANSLATION TABLE FOR A ROTATING RESONATOR MECHANISM, IN PARTICULAR FOR A HOROLOGICAL MOVEMENT

CROSS-REFERENCE TO RELATED APPLICATION

This application claims priority to European Patent Application No. 20204744.5 filed on Oct. 29, 2020, the entire disclosure of which is hereby incorporated herein by reference.

FIELD OF THE INVENTION

The present invention relates to a flexible guide with a translation table for a rotating resonator mechanism, in particular for a horological movement. The invention further relates to a rotating resonator mechanism provided with such a flexible guide.

BACKGROUND OF THE INVENTION

Most mechanical watches today are equipped with a sprung balance and a Swiss lever escapement mechanism. The sprung balance constitutes the time base of the watch. It is also referred to as a resonator.

The escapement has two main functions:
to maintain the two-and-fro motions of the resonator;
to count these to-and-fro motions.

An inertial element, a guide and an elastic return element are required in order to constitute a mechanical resonator. Conventionally, a balance spring acts as an elastic return element for the inertial element constituted by a balance. This balance is guided in rotation by pivots which rotate inside plain ruby bearings. This leads to friction, and thus to energy losses and running disturbances, which are position-dependent and which should ideally be eliminated.

Flexible guides are currently used as a spring to form a virtual pivot. Virtual-pivot flexible guides allow horological resonators to be substantially improved. The simplest thereof are cross-blade pivots, consisting of two guiding devices with straight blades that cross one another, generally at right angles. These two blades can be either three-dimensional in two different planes, or two-dimensional in the same plane and are thus as if welded at the point of intersection therebetween.

However, isochronous motion cannot be obtained when looking to use flexible blades to pivot a rotating annular balance in a manner similar to the motion of a balance with a balance spring. More specifically, a perfectly periodic rotary motion of the weight cannot be obtained. The return torque is non-linear, which results in anisochronism as a function of the amplitude of the displacement of the weight and a rate variation of the movement. Moreover, the axis of rotation of these resonators is not fixed and moves as the balance rotates. This interfering motion is small, however it affects the rate of the movement because of the change in orientation of the watch with respect to gravity.

SUMMARY OF THE INVENTION

One purpose of the invention is thus to propose a flexible guide for a rotating resonator mechanism that does not suffer from the aforementioned problems.

To this end, the invention relates to a flexible guide for a rotating resonator mechanism, in particular of a horological movement, the guide comprising a fixed support, an element that is capable of moving relative to the fixed support, and at least one main flexible blade allowing the movable element to move relative to the fixed support by bending the one or more main flexible blades via a rotary motion about a centre of rotation, the flexible guide being arranged substantially in one plane.

The flexible guide is noteworthy in that it comprises at least one translation table joined to one end of the main flexible blade, the main flexible blade and the translation table being arranged in series and forming a pair connected to the fixed support, to the movable element, or to an intermediate movable part, such that the translation table is configured to move in translation at least in part under the effect of the bending of the main flexible blade.

The invention thus provides an isochronous flexible-blade guide. More specifically, the translation table allows the main blade to move as it bends, thus maintaining a substantially constant return coefficient. Thus, the motion of the balance is isochronous. Such a flexible guide guarantees an isochronous motion.

According to one advantageous embodiment, the guide comprises at least three pairs, for example four pairs, each pair being formed by a main blade and a translation table, the pairs being angularly distributed so as to form a symmetrical pivot, each main blade being joined at one end to a translation table.

According to one advantageous embodiment, the translation table is arranged in series between the fixed support and said main flexible blade, the translation table being joined to the fixed support and to a first end of the main flexible blade, the main flexible blade being joined to the movable element at a second end.

According to one advantageous embodiment, the translation table is arranged in series between said main flexible blade and the movable element, the translation table being joined to the movable element and to the second end of the main flexible blade, the main flexible blade being joined to the fixed support at the first end.

According to one advantageous embodiment, the guide comprises at least six pairs, preferably eight pairs, each pair consisting of a main blade and a translation table, the pairs being angularly distributed about a central part, so as to form a symmetrical pivot, each main blade being joined at one end to the central part, at least three pairs being joined to the fixed support and at least three pairs being joined to the movable element by the translation table.

According to one advantageous embodiment, the pairs joined to the fixed support and the pairs joined to the movable element are distributed alternately about the central part.

According to one advantageous embodiment, the movable element comprises the central part of the guide, to which the main flexible blades are joined.

According to one advantageous embodiment, the fixed support comprises a central part of the guide, to which the main flexible blades are joined.

According to one advantageous embodiment, the guide comprises a central part forming an intermediate element between the support and the movable element, to which the main flexible blades are joined.

According to one advantageous embodiment, the translation table comprises at least one secondary flexible blade and a rigid part, the secondary flexible blade being joined at one end to the rigid part and at another end to the fixed support, to the movable element or to the central part.

According to one advantageous embodiment, the translation table comprises two secondary flexible blades joined to the same face of the rigid part.

According to one advantageous embodiment, the translation table comprises at least two secondary flexible blades, the secondary flexible blades being joined at one end to the main flexible blade and at another end to the fixed support, to the movable element or to the central part.

According to one advantageous embodiment, the secondary flexible blades are disposed in different rows.

According to one advantageous embodiment, the secondary flexible blades are substantially parallel.

According to one advantageous embodiment, the rigid part forms a bend such that the one or more main flexible blades are substantially perpendicular to the one or more secondary flexible blades of the translation table joined to the main flexible blade when the guide is in the rest position.

According to one advantageous embodiment, the movable element comprises a balance, which is for example centred about the central part.

According to one advantageous embodiment, each translation table is connected to only one main flexible blade.

According to one advantageous embodiment, a pair is connected to only two different parts from among the fixed support, the movable element and the intermediate movable part.

The invention further relates to a rotating resonator mechanism, in particular for a horological movement, the mechanism including a flexible guide according to the invention.

BRIEF DESCRIPTION OF THE DRAWINGS

Other features and advantages of the present invention will appear after reading the plurality of embodiments, which are provided for purposes of illustration only and not intended to limit the scope of the invention, given with reference to the accompanying drawings, wherein.

DETAILED DESCRIPTION OF PREFERRED EMBODIMENTS

Figure 1:
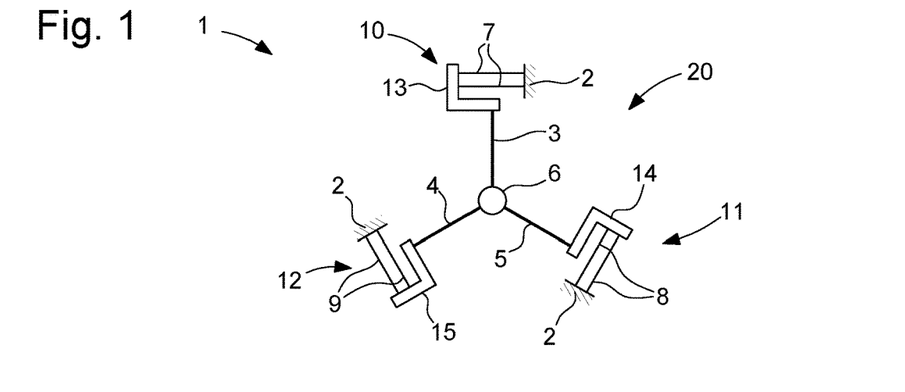
FIG. 1 is a diagrammatic, overhead view of a flexible guide according to a first embodiment of the invention.
Figure 2:
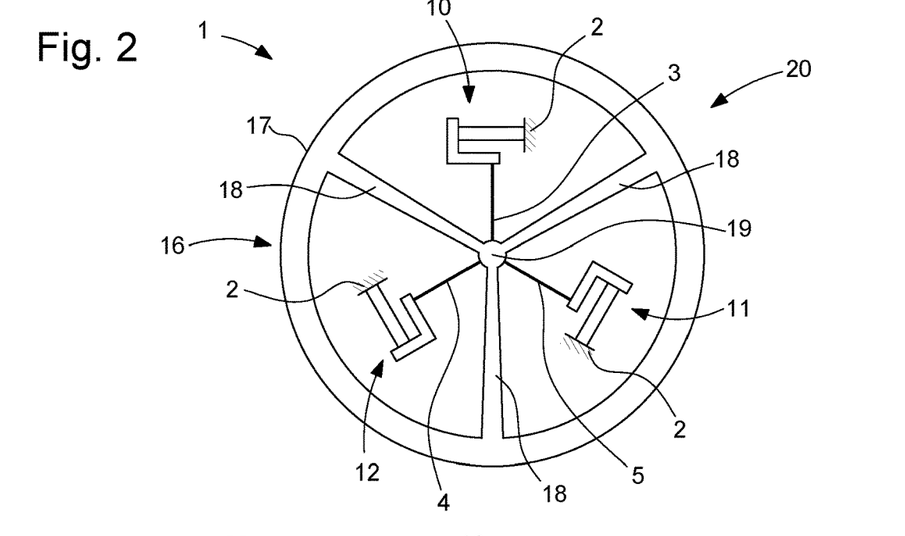
FIG. 2 is a diagrammatic, overhead view of the flexible guide with a balance according to the first embodiment of the invention.
Figure 3:
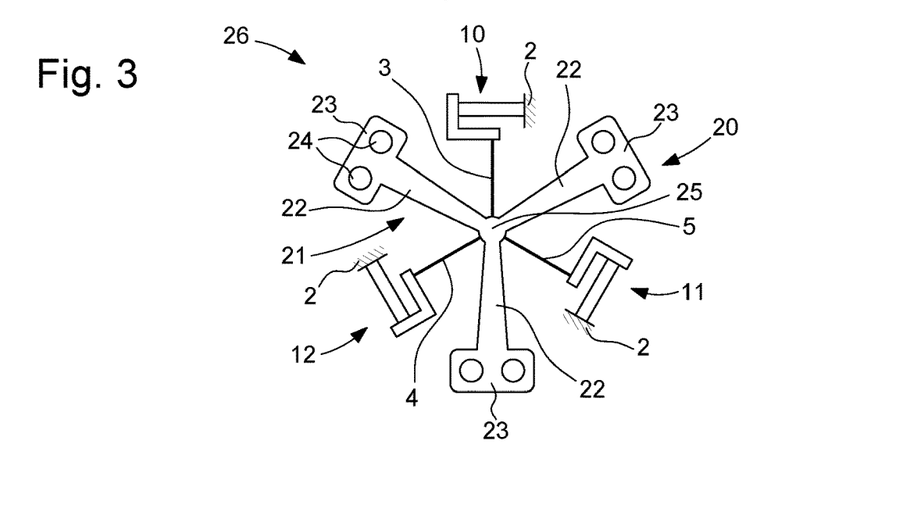
FIG. 3 is a diagrammatic, overhead view of a flexible guide according to an alternative to the first embodiment of the invention.

FIGS. 1 to 3 show a first embodiment of a flexible guide 1 for a rotating resonator mechanism, in particular of a horological movement. The flexible guide 1 is arranged substantially in one plane. The flexible guide comprises a fixed support 2, an element 20 that is capable of moving relative to the fixed support 2 and three main flexible blades 3, 4, 5 each connecting the movable element 20 to the support 2. The main flexible blades 3, 4, 5 allow the movable element 20 to move relative to the fixed support 2. By bending the main flexible blades 3, 4, 5, the movable element 20 can move relative to the support 2 in a rotary motion about itself around a centre of rotation. The main blades 3, 4, 5 are preferably of the same length and angularly distributed evenly about a central part 6 of the movable element 20, so as to form a symmetrical pivot.

According to the invention, the flexible guide 1 comprises translation tables 10, 11, 12, each translation table being joined to one end of a different main flexible blade 3, 4, 5. In this embodiment, the translation table 10, 11, 12 is arranged in series between the fixed support 2 and said corresponding main flexible blade 3, 4, 5. The translation table 10, 11, 12 is joined to the fixed support 2 and to a first end of the corresponding main flexible blade 3, 4, 5, the main flexible blade 3, 4, 5 being joined to the central part 6 by a second end. Each translation table 10, 11, 12 and a different main flexible blade 3, 4, 5 are arranged in series. A translation table 10, 11, 12 is connected to a single main flexible blade 3, 4, 5.

Thus, the flexible guide 1 comprises three pairs, each pair consisting of a main flexible blade 3, 4, 5 and a translation table 10, 11, 12. The pairs are angularly distributed about the central part 6, so as to form a symmetrical pivot, each main blade 3, 4, 5 being joined at one end to the central part 6 and the translation table 10, 11, 12 being joined to the fixed support 2. The pairs, in particular the main blades 3, 4, 5, form an angle of about 120° with one another. The central part 6 is for example a portion of a circular cylinder. In this embodiment, the movable element 20 comprises the central part 6.

Each translation table 10, 11, 12 is configured to move in translation at least in part under the effect of the motion of the main flexible blade 3, 4, 5. Each translation table 10, 11, 12 comprises at least one secondary flexible blade 7, 8, 9, in this case two secondary flexible blades 7, 8, 9, and a rigid part 13, 14, 15. The secondary flexible blades 7, 8, 9 are joined at one end to the rigid part 13, 14, 15, and at another end to the fixed support 2. The secondary flexible blades 7, 8, 9 are substantially parallel and are disposed in different rows. Preferably, the secondary flexible blades 7, 8, 9 are joined to the same face of the rigid part 13, 14, 15. In this case, the rigid part 13, 14, 15 forms a right-angled bend, the bend including two substantially perpendicular segments. The main flexible blade 3, 4, 5, is joined to the first segment, whereas the secondary blades 7, 8, 9 are joined to the second segment. Thus, the main flexible blades 3, 4, 5 are substantially perpendicular to the secondary flexible blades 7, 8, 9 of the translation table 10, 11, 12 when the guide 1 is in the rest position. The rest position is defined as being when the main blades 3, 4, 5 and the secondary blades 7, 8, 9 are straight, i.e. not bent.

In FIG. 2, the movable element 20 further comprises a balance 16, which is ring-shaped. The balance 16 includes an outer annular part 17 and arms 18, in this case three arms, joining the annular part 17 to a joint 19 that is axial to the annular part 17. The arms 18 are concentric and of equal length. The balance 16 is assembled on the central part 6 by the joint 19. Preferably, the central part 6 and the joint 19 are made in one piece. Thus, the balance 16 is centred relative to the central part 6. In this alternative embodiment, the balance is made of the same material, i.e. it is made in one piece.

When the balance 16 is in motion, it follows, within the plane of the balance 16, a periodic rotational motion in one direction, then in the other direction, about an axis passing through the joint 19 and the central part 6. The main flexible blades 3, 4, 5 bend and act as a return spring for the balance 16 to rotate it in the other direction and vice versa. The translation tables 10, 11, 12 allow the main blades 3, 4, 5 to move longitudinally as they bend. The rigid parts 13, 14, 15 of the translation tables 10, 11, 12 move towards the central part 6 by means of the secondary blades 7, 8, 9 when the main blades 3, 4, 5 bend, and move away from the central part 6 when the main blades 3, 4, 5 straighten. This ensures that the motion of the balance 16 remains isochronous.

In the second alternative flexible guide 26 of the first embodiment in FIG. 3, the movable element 20 includes at least two members. The first member 21 comprises arms 22, in this case three arms, and an axial joint 25 made in one piece. The arms 22 are equipped, at the free ends thereof, with an attachment platform 23 provided with holes 24 for assembling an inertial element, such as an inertia-block or a ring, the inertial element defining the second member of the balance 20 and not shown in FIG. 3. The other parts of the flexible guide 26 are identical to the first alternative embodiment. Preferably, the central part 6 and the first member 21 are made in one piece.

Figure 4:
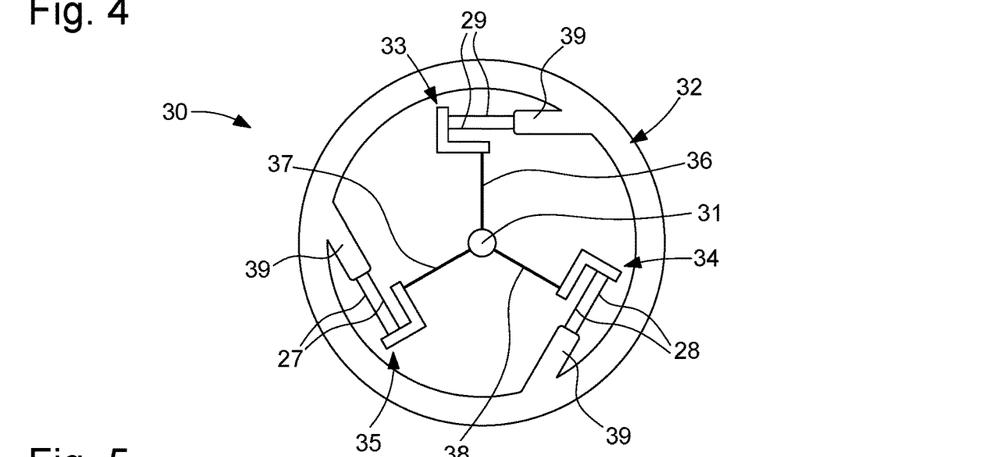
FIG. 4 is a diagrammatic, overhead view of a flexible guide according to a second embodiment of the invention.

The second embodiment in FIG. 4 shows an example of a flexible guide 30 wherein the translation tables 33, 34, 35 are joined to the movable element 32, which preferably has an annular shape. The flexible guide 30 comprises a fixed support 31, a movable element 32, and three pairs consisting of a main flexible blade 36, 37, 38 and a translation table 33, 34, 35. Each translation table 33, 34, 35 is arranged in series between a main flexible blade 36, 37, 38 and the movable element 32. Each main flexible blade 36, 37, 38 is joined to the fixed support 31 at a first end. The translation table 33, 34, 35 is joined to the annular part of the movable element 32 and to the second end of the main flexible blade 36, 37, 38. In this embodiment, the fixed support 31 comprises the central part to which the first ends of the main flexible blades 36, 37, 38 are joined. The central part also takes the shape of a cylindrical portion and is preferably circular. Preferably, the movable element 32 includes three inner extensions 39 oriented in the plane towards the inside of the ring, to allow for the assembly of the secondary flexible blades 27, 28, 29 of each translation table 33, 34, 35. The secondary flexible blades 27, 28, 29 are substantially parallel and are disposed in different rows. Preferably, the secondary flexible blades 27, 28, 29 are joined to the same face of the rigid part. The extensions 39 extend in a direction substantially perpendicular to the direction of the main flexible blades 36, 37, 38 when in the rest position, such that the secondary flexible blades 27, 28, 29 are directed in this direction. Thus, the secondary flexible blades 27, 28, 29 are substantially perpendicular to the direction of the main flexible blades 36, 37, 38. In this embodiment, the translation tables 33, 34, 35 are not directly joined to the fixed support 31, but to the movable element 32. The effect obtained is the same as in the first embodiment, in particular with regard to the isochronism of the motion of the balance 32.

Figure 5:
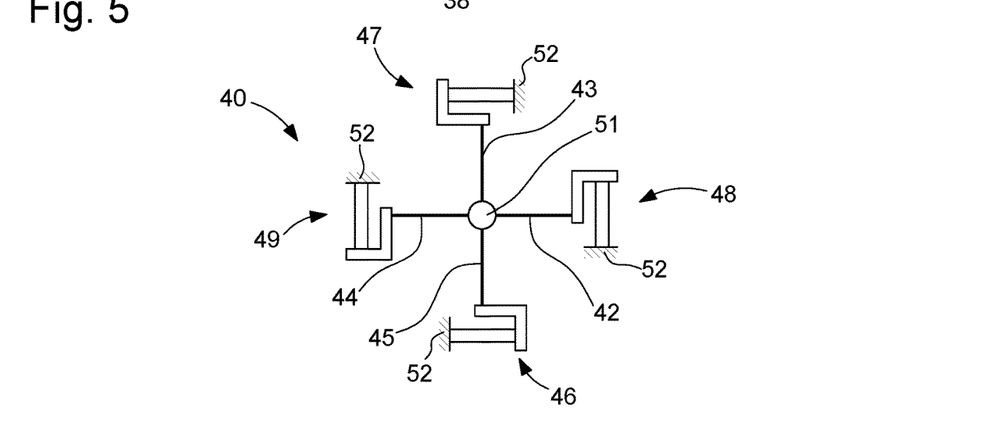
FIG. 5 is a diagrammatic, overhead view of a flexible guide according to a third embodiment of the invention.
Figure 6:
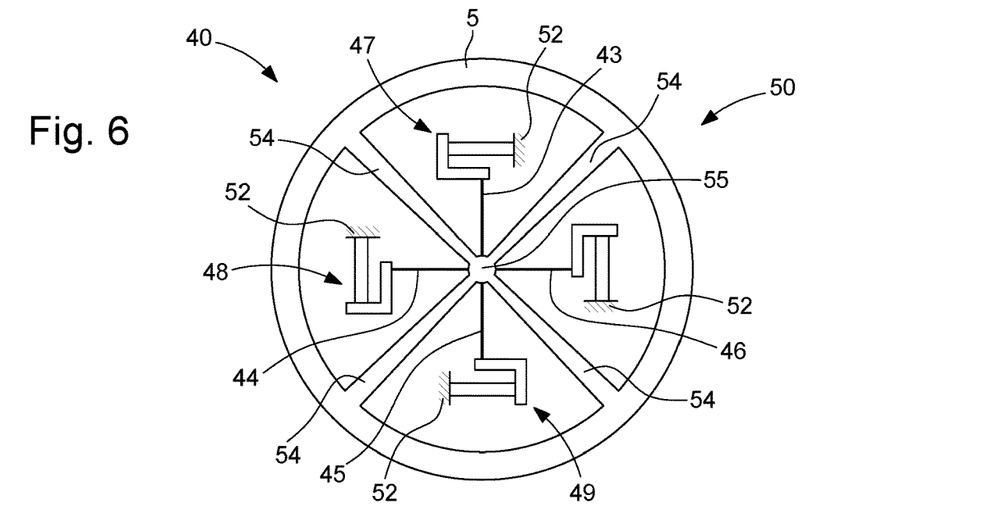
FIG. 6 is a diagrammatic, overhead view of the flexible guide with a balance according to the third embodiment of the invention.

The third embodiment of a flexible guide 40 in FIGS. 5 and 6 is similar to the first embodiment, but comprises four pairs consisting of a translation table 46, 47, 48, 49 and a main flexible blade 42, 43, 44, 45, in addition to the movable element 50 and the fixed support 52. The four pairs allow the guide to be symmetrical every 90°, in particular to comply with the properties of anisotropic materials, which can be used to manufacture the guide. The properties of the material change periodically depending on the orientation, for example every 90° for silicon. The pairs are angularly distributed about the central part 51 of the movable element 50 to form a symmetrical pivot. The pairs, in particular the main flexible blades 42, 43, 44, 45, form a substantially perpendicular angle with one another of approximately 90°. As seen in the first embodiment, the four translation tables 46, 47, 48, 49 are each arranged between a main flexible blade 42, 43, 44, 45 and the fixed support 52. Each main flexible blade 42, 43, 44, 45 is joined to a translation table 46, 47, 48, 49 at one end and to the central part 51 at the other end. The movable element 50 comprises a preferably annular balance 53 equipped with four arms 54 joining at an axial joint 55. Preferably, the central part 51, the joint 55, the annular part 53 and the arms 54 are made in one piece.

Figure 7:
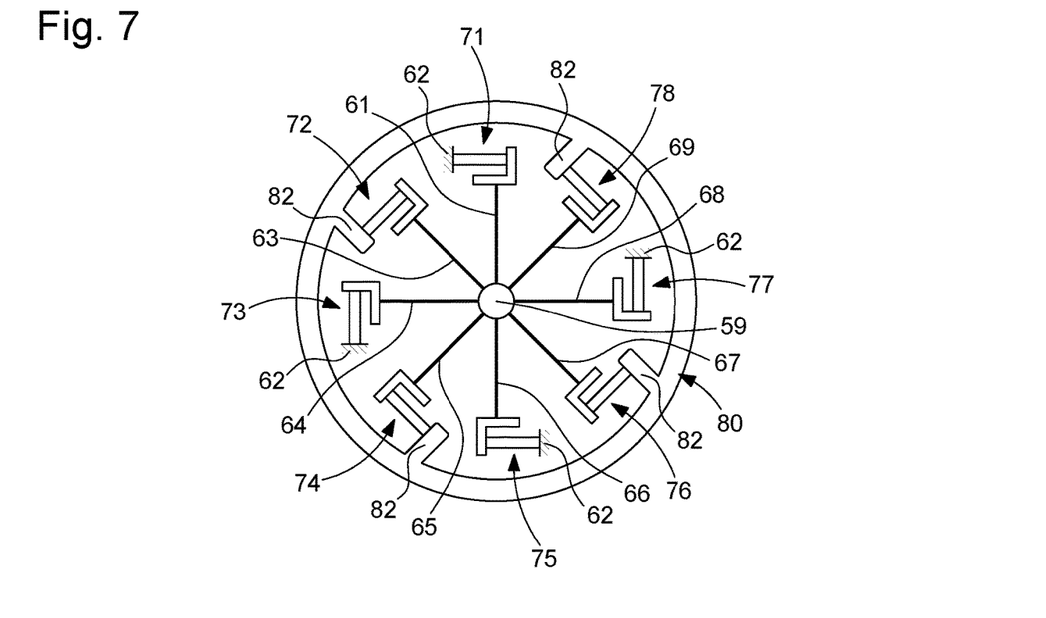
FIG. 7 is a diagrammatic, overhead view of a flexible guide according to a fourth embodiment of the invention.
Figure 8:
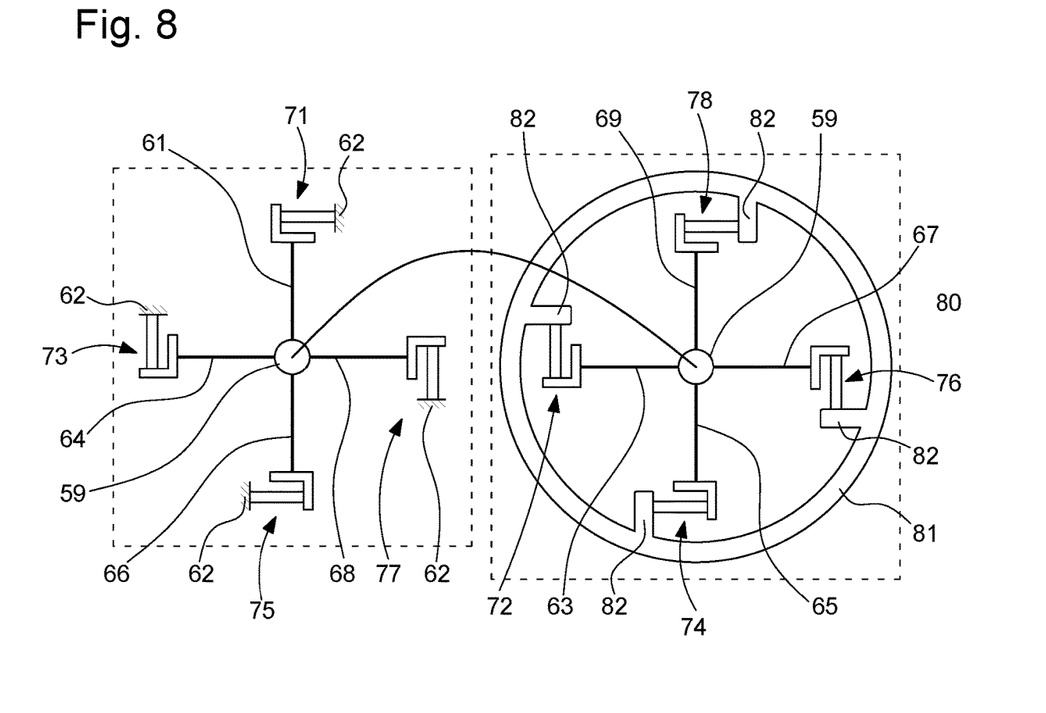
FIG. 8 is a diagrammatic view of the flexible guide according to the fourth embodiment of the invention in a partially disassembled state.

FIGS. 7 and 8 show a fourth embodiment of a flexible guide 60 comprising eight pairs, each pair being formed in series by a main flexible blade 61, 63, 64, 65, 66, 67, 68, 69 and a translation table. The pairs 71-61, 72-63, 73-64, 74-65, 75-66, 76-67, 77-68, 78-69 are angularly distributed about a central part 59, so as to form a symmetrical pivot. Each main flexible blade 61, 63, 64, 65, 66, 67, 68, 69 is joined at one end to the central part 59. Four pairs are joined to the fixed support 62 by the translation tables 71, 73, 75, 77, and four pairs are joined to the balance 81 by the translation tables 72, 74, 76, 78. The central part 59 is capable of moving, has a cylindrical shape, preferably a circular shape, and forms an intermediate member that is capable of moving between the support 62 and the movable element 80. The movable element 80 comprises a balance 81 that is preferably ring-shaped, provided with four extensions 82 extending towards the inside of the ring. The extensions 82 extend such that they are substantially orthogonal to the tangent of the ring so that the secondary blades of the translation tables 72, 74, 76, 78 and the main blades 63, 65, 67, 69 are substantially perpendicular.

In FIG. 8, the flexible guide 60 of the fourth embodiment is cut into two parts. On the left, a first part comprises the support 62 and four pairs 71-61, 73-64, 75-66, 77-68. On the right, a second part comprises four pairs 72-63, 74-65, 76-67, 78-69 and the balance 81. The central part 59 is shown in both parts of FIG. 8. In the assembled position, the two parts are superimposed, with the central part 59 being as one. Thus, the two parts extend in two parallel planes.

Figure 9:
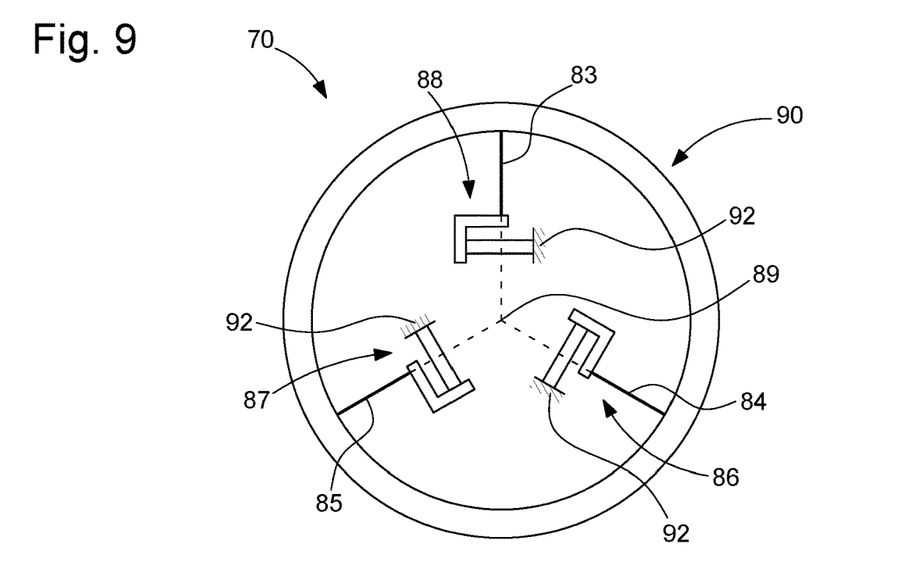
FIG. 9 is a diagrammatic, overhead view of a flexible guide according to a fifth embodiment of the invention.

The fifth embodiment of the flexible guide 70 in FIG. 9 comprises translation tables 86, 87, 88 arranged in the centre of the flexible guide 70. The flexible guide 70 includes three pairs, each consisting of a main flexible blade 83, 84, 85 and a translation table 86, 87, 88. The pairs are angularly distributed about a virtual centre 89. The main flexible blades 83, 84, 85 are each connected at a first end to a translation table 86, 87, 88, and at a second end to the movable element 90. The movable element 90 is ring-shaped. Each translation table 86, 87, 88 is connected to a fixed support 92 by the secondary flexible blades, and to a main flexible blade 83, 84, 85 by the rigid part.

In the embodiments described hereinabove, the translation tables are configured such that the one or more secondary blades are substantially perpendicular to the main flexible blade when the flexible guide is at rest. However, other alternative embodiments are possible, such as those shown in FIGS. 10 to 12, which can advantageously replace the translation tables described in the above embodiments.

Figure 10:
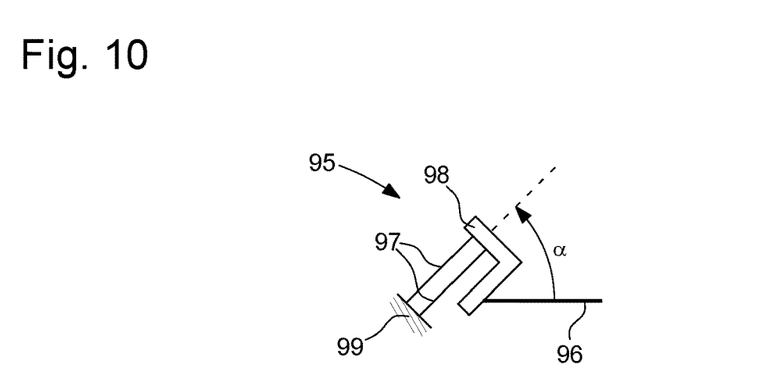
FIG. 10 is a diagrammatic, overhead view of a translation table according to a first alternative embodiment of the invention.

In FIG. 10, the first alternative translation table 95 allows the main flexible blade 96 to be directed at an angle α that is different from 90° to the secondary flexible blades 97. The main flexible blade 96 is assembled with the rigid part 98, forming an angle α. The rigid part 98 takes the shape of a bend with two perpendicular segments. The secondary flexible blades 97 connect a first segment of the bend to the support 99, whereas the second segment of the bend is joined by the main flexible blade 96 at the angle α. The angle α is preferably comprised between 20° and 80°, or even between 30 and 60°.

Figure 11:
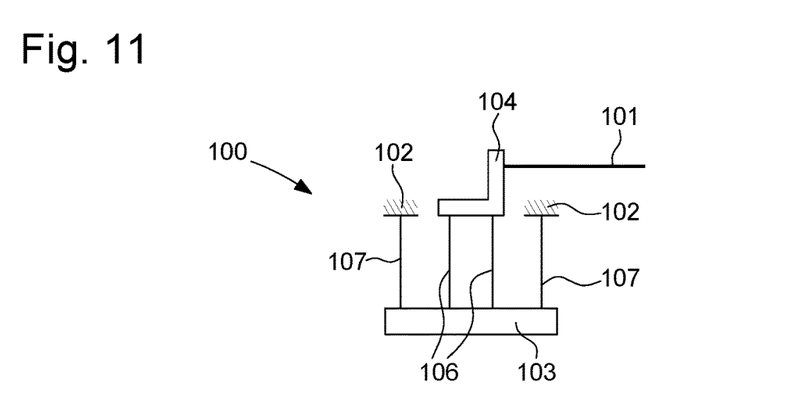
FIG. 11 is a diagrammatic, overhead view of a translation table according to a second alternative embodiment of the invention.

FIG. 11 shows a dual translation table 100, comprising a first bent rigid part 104 connected to the main flexible blade 101, the secondary flexible blades 106 being connected to a second straight rigid part 103. The second rigid part is connected to the support 102 by two tertiary flexible blades 107. In the rest position, the secondary flexible blades 106 and tertiary flexible blades 107 are substantially parallel and substantially perpendicular to the main flexible blade 101 thanks to the first bent rigid part 104. The secondary blades 106 and tertiary blades 107 are joined to the same face of the second rigid part 103, the secondary blades 106 being arranged between the two tertiary blades 107.

Figure 12:
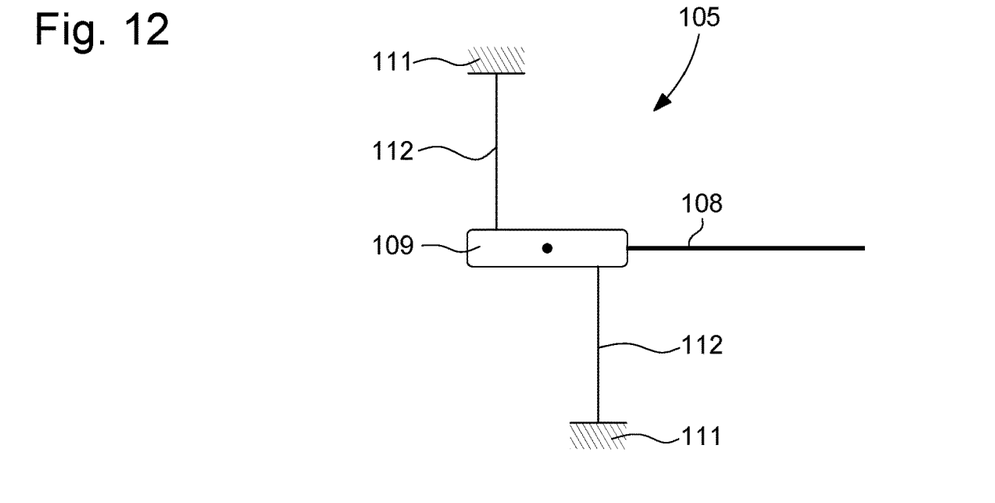
FIG. 12 is a diagrammatic, overhead view of a translation table according to a third alternative embodiment of the invention.

The alternative translation table 105 shown in FIG. 12 includes a straight rigid part 109. The two secondary flexible blades 112 are arranged on either side of the rigid part 109, from a long side of the rigid part 109 to join it to the support 112. The main flexible blade 108 is joined to a short side of the rigid part 109.

Figure 13:
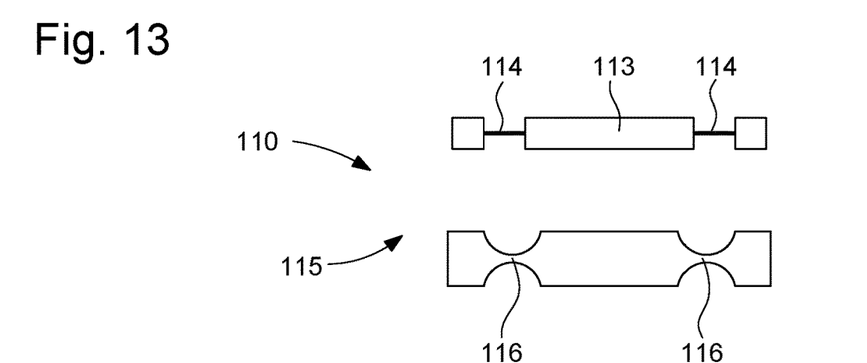
FIG. 13 is a diagrammatic, overhead view of two alternative embodiments of flexible blades.

In the figures showing the different embodiments of the flexible guides, the flexible blades are flat blades. However, the flexible blades can also comprise thicker or thinner parts, or can comprise necks, such as those shown in FIG. 13. Thus, the top blade 110 comprises a thicker part 113 in the middle, which is more rigid, and thinner parts 114 at the ends. The bottom blade 115 is thick throughout the length thereof, but comprises two necks 116 that are thinned at the ends to allow the blade 115 to flex.

Figure 14:
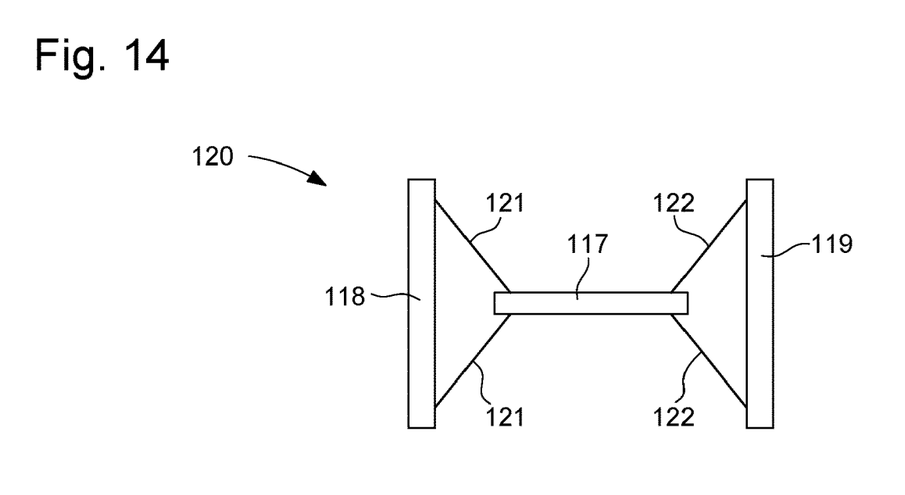
FIG. 14 is a diagrammatic, overhead view of a flexible arrangement according to the invention.

FIG. 14 shows a flexible assembly 120, which can replace one or more flexible blades of the flexible guides described hereinabove. The assembly 120 comprises two staggered blade pivots and a central rigid part 117. Each of the staggered blade pivots includes a pair of staggered blades 121, 122, connected to the rigid part 117. The rigid part 117 is straight, with each of the two pairs of staggered blades 121, 122 being arranged at one end of the rigid part 117. The blades 121, 122 are joined to an element 118, 119 disposed on either side of the rigid part 117. These elements 118, 119 can be a fixed support, a movable element, or an intermediate element of a flexible guide as described hereinabove. The blades 121, 122 of a pair are close together at the rigid part 117, and far apart at the elements 118, 119.

The invention further relates to a resonator mechanism, in particular for a horological movement, not shown in the figures. The resonator mechanism is provided with a flexible guide according to one of the embodiments described hereinabove.

It goes without saying that the invention is not limited to the embodiments described with reference to the figures and alternatives can be considered without leaving the scope of the invention.

In particular, a greater or lesser number of pairs consisting of a main flexible blade and a translation table than the examples described can be considered.

In an alternative embodiment, the one or more translation tables do not comprise a rigid part. Thus, the one or more secondary flexible blades are joined at one end to the main flexible blade, and at another end to the fixed support, to the movable element or to the central part. The secondary flexible blades and the main flexible blade can be joined directly to one another, or by a thin flexible part.

The invention claimed is:

1. A flexible guide for a rotating resonator mechanism of a horological movement, the flexible guide comprising:
   a fixed support,
   a movable element configured to move relative to the fixed support,
   at least one main flexible blade allowing the movable element to move relative to the fixed support by bending the one or more main flexible blades via a rotary motion about a center of rotation, the flexible guide being arranged substantially in one plane, and
   at least one translation table, wherein each translation table of the at least one translation table is joined to one end of a corresponding main flexible blade of the at least one main flexible blade, the corresponding main flexible blade and the translation table being arranged in series and forming a pair connected to the fixed support such that the translation table is configured to move in translation at least in part under an effect of the bending of the corresponding main flexible blade,
   wherein each translation table of the at least one translation table is arranged in series between the fixed support and the corresponding main flexible blade, the translation table being joined to the fixed support and to a first end of the corresponding main flexible blade,
   the correspond main flexible blade is joined to the movable element at a second end, and
   the movable element comprises a central part to which each of the at least one main flexible blades are joined.

2. The flexible guide according to claim 1, wherein the at least one main flexible blade includes three main flexible blades and the at least one translation table includes three translation tables such that the flexible guides comprises three pairs, each pair being formed by a corresponding main flexible blade and a corresponding translation table of the three translation tables, the three pairs being angularly distributed so as to form a symmetrical pivot, each corresponding main flexible blade being joined at one end to one of the three translation tables.

3. A flexible guide for a rotating resonator mechanism of a horological movement, the flexible guide comprising:
   a fixed support;
   a movable element configured to move relative to the fixed support;
   at least one main flexible blade allowing the movable element to move relative to the fixed support by bending the one or more main flexible blades via a rotary motion about a center of rotation, the flexible guide being arranged substantially in one plane; and at least one translation table, wherein each translation table of the at least one translation table is joined to one end of a corresponding main flexible blade of the at least one main flexible blade, the corresponding main flexible blade and the translation table being arranged in series and forming a pair connected to the fixed support such that the translation table is configured to move in translation at least in part under an effect of the bending of the corresponding main flexible blade, wherein each translation table of the at least one translation table is arranged in series between a single corresponding main flexible blade and the movable element, the translation table being joined to the movable element and to the second end of the corresponding main flexible blade, the corresponding main flexible blade being joined to the fixed support at the first end, and wherein each translation table comprises two secondary flexible blades, the secondary flexible blades being joined at one end to a rigid part of the translation table and at another end to the movable element.

4. The flexible guide according to claim 1, wherein the at least one main flexible blade includes six main flexible blades and the at least one translation table includes six translation tables such that the flexible guides comprises six pairs, each pair consisting of a corresponding main flexible blade of the six flexible blades and a corresponding translation table of the six translation tables, the six pairs being angularly distributed about a central part of the fixed support, so as to form a symmetrical pivot, each main flexible blade being joined at one end to the central part of the fixed support, three pairs being joined to the fixed support and three pairs being joined to the movable element, by the corresponding translation table.

5. The flexible guide according to claim 4, wherein the three pairs joined to the fixed support and the three pairs joined to the movable element are distributed alternately about the central part of the fixed support.

6. The flexible guide according to claim 3, wherein the fixed support comprises a central part of the flexible guide, to which each of the at least one main flexible blades are joined.

7. The flexible guide according to claim 4, further comprising the central part of the fixed support forming an intermediate element between the support and the movable element, to which each of the six main flexible blades are joined.

8. The flexible guide according to claim 1, wherein each translation table comprises two secondary flexible blades and a rigid part, the two secondary flexible blades being joined at one end to the rigid part and at another end to the fixed support.

9. The flexible guide according to claim 3, wherein the translation table comprises the two secondary flexible blades, which are joined to a same face of the rigid part.

10. The flexible guide according to claim 8, wherein the rigid part forms a bend, such that the each corresponding main flexible blade is perpendicular to the two secondary flexible blades of the corresponding translation table joined to the corresponding main flexible blade when the guide is in the rest position.

11. The flexible guide according to claim 3, wherein the secondary flexible blades are disposed in different rows.

12. The flexible guide according to claim 11, wherein the secondary flexible blades are substantially parallel.

13. The flexible guide according to claim 1, wherein the movable element comprises a balance, which is centered about the central part.

14. A rotating resonator mechanism for a horological movement, comprising the flexible guide according to claim 1.

15. A flexible guide for a rotating resonator mechanism of a horological movement, the flexible guide comprising:

a fixed support;

a movable element configured to move relative to the fixed support;

at least one main flexible blade allowing the movable element to move relative to the fixed support by bending the one or more main flexible blades via a rotary motion about a center of rotation, the flexible guide being arranged substantially in one plane; and at least one translation table, wherein each translation table of the at least one translation table is joined to one end of a corresponding main flexible blade of the at least one main flexible blade, the corresponding main flexible blade and the translation table being arranged in series and forming a pair connected to the fixed support such that the translation table is configured to move in translation at least in part under an effect of the bending of the corresponding main flexible blade, wherein the at least one main flexible blade includes a plurality of main flexible blades and the at least one translation table includes a corresponding plurality of translation tables such that the flexible guides comprises a plurality of pairs, each pair consisting of a corresponding main flexible blade of the six flexible blades and a corresponding translation table, the plurality of pairs being angularly distributed about a central part of the fixed support, so as to form a symmetrical pivot, each main flexible blade being joined at one end to the central part of the fixed support, a first subset of the plurality of pairs being joined to the fixed support and a second subset of the plurality of pairs being joined to the movable element, by the corresponding translation table.

* * * * *